United States Patent Office 2,698,309
Patented Dec. 28, 1954

2,698,309

PAPER COATING WAX

Herman L. Thwaites, Clark, and Harold F. Hitchcox, Cranford, N. J., assignors to Standard Oil Development Company, a corporation of Delaware No Drawing. Application April 16, 1952,
Serial No. 282,676

7 Claims. (Cl. 260—28.5)

This invention relates to a paper coating composition and relates more particularly to a paper coating composition comprising a mixture of refined paraffin wax, polyethylene and a low molecular weight polyethylene containing a terminal hydroxyl group.

Several types of waxes may be derived from petroleum oils and in order that no confusion will arise with respect to the types of wax employed in this invention, a brief description will be given of the method for preparing the wax used in the present invention.

The term "paraffin" wax is used to define the hard, crystalline wax commonly obtained from petroleum distillates derived from mineral oils of the mixed base or paraffin base type. By the present refining methods, the crude oil is subjected to distillation whereby it is separated into a series of fractions, one of which is known as "paraffin distillate." The wax is separated from the paraffin distillate by chilling and filtering or by the use of a solvent as, for example, propane or a ketone such as methyl ethyl ketone. The wax obtained by either of these methods still contains from 10 to 50% oil and is generally referred to as "slack wax." This slack wax is subjected to a "sweating operation" to remove the oil. The resulting wax usually contains 3 to 6% oil, but by proper sweating the oil may be as low as 1 to 3%. This wax known as "crude scale wax" is again sweated to reduce the oil content to less than 0.5% and even as low as 0.05%. This product is known as "refined wax" or "paraffin wax" and is graded according to tensile strength, melting point, oil content, hardness, etc.

It is known to add polyethylene to wax to prepare a suitable coating composition for paper and the like. The addition of polyethylene increases the blocking temperature of the wax, but does not affect the sealing strength to any great degree. On the other hand, the addition of low molecular weight polyethylene having a terminal hydroxyl group has less effect on the blocking temperature than regular polyethylene while the sealing strength is materially improved.

According to the present invention, it has been found that both the blocking temperature and the sealing strength are improved to a greater degree than would be expected by the addition of small amounts of both polyethylene and polyethylene having a terminal hydroxyl group to paraffin wax.

The polyethylene to be added in accordance with this invention should have a molecular weight of 4,000 to 25,000, preferably 12,000 to 13,000. The polyethylene having a terminal hydroxyl group should have a molecular weight of 500 to 10,000, preferably about 2,000. The polymers should be added in total amounts which may range from 0.5 to 10.0%, preferably from 1.5 to 2.5%. The amount of each polymer may vary from 40 to 60% of the total.

The polyethylene having a terminal bond may be prepared in accordance with the disclosure in U. S. 2,504,400 issued April 18, 1950, to M. Erchak, Jr. In general, the hydroxyl group is caused to enter the polymer chain by polymerizing ethylene under 425 to 475 atmospheres at temperatures between 140° and 200° C. in the presence of isopropanol and hydrogen peroxide.

The following data illustrate the benefits to be obtained in accordance with this invention:

Example

Wax blends were prepared in 500 gram quantities by first melting paraffin wax having a melting point of 132° F. and then blending in the desired polymer while heating. Solutions were obtained in 15 to 20 minutes at temperatures of 220–230° F. The blends were then subjected to scuffing, blocking and sealing strength tests.

In the scuff test, 25 lbs. sulfite bread wrap paper stock was coated with 13 to 14 lbs. of wax per ream and the paper allowed to condition at least 24 hours at 73° F. at 50% relative humidity. Folded strips 1 in. x 4.5 in. were then cut from the paper and inserted in a Marathon Corporation scuff tester. One end of the paper strip was placed in a clamp which was fastened to a screw device to control its movement. The strip was then placed, while still clamped, between hard rubber pads covered with a clean abrasive tissue paper. The whole assembly was loaded with a 2 kg. weight and the strip was pulled between the tissues at a constant rate. The scuff loss, reported as mg./100 sq. in., is calculated from the loss in weight of the scuffed area.

The blocking test is one of the conventional type of blocking tests patterned after the Marathon Corporation procedure. In this test the coated paper (same as that used in the scuff test) was cut into 1 in. x 18 in. folded strips. These were placed between unwaxed paper strips and the center portion was covered with a 1¼ in. x 18 in. sponge pad and 3 1 in. x 1 in. x 6 in. steel weights. This assembly was placed in a constant temperature oven at the estimated blocking point. Additional specimens were prepared in the same manner as above and placed in constant temperature ovens at a series of temperatures differing by about 5° F. and bracketing the estimated blocking temperature. After 16 hours storage, the samples were removed and cooled under pressure. The test strips were then carefully pulled apart to find 2 pairs tested at successive 5° temperatures, one showing negligible mar and the second showing considerable or complete mar. The latter is taken as the blocking temperature.

The sealing strength was determined for papers waxed as in the above tests. In this case, 14 in. lengths are cut and folded with the test surfaces inwards. Fifteen 2 in. x 7 in. folded strips were then cut for each wax sample and sealed on a 200° F. hot plate with a ½ in. diameter, 2½ in. long steel roller weighing about 100 gm. Ten of the sealed strips were immediately placed on a 73° F. metal plate to allow slow chilling of the seal. The other five strips were sealed and quickly plunged into water at 50° F. to quick-chill the seal. Each of the samples was then conditioned 16 to 20 hours at 73° F. and 50% relative humidity. A 1 in. x 4½ in. strip was cut from the center of each. For the quick-pull, slow-chill test each of 5 strips was inserted in a Thwing Albert research tear tester and the sealing strength was read directly. The results for the 5 strips were averaged to obtained the final sealing strength value. For the slow pull method, 5 each of the quick and slow chilled samples were tested on a Socony-Vacuum type sealing tester in which a given load was placed on one end of the sealed strips and the unsealed flaps at the other end were pulled apart by strings hung over pulleys located about 6 in. apart but on the same horizontal plane. As the strings were pulled at a rate of 4 in. per minute, the specimen rose until it either entirely split the seal or remained stationary and the seal "peeled" as the strings were pulled. Sealing strengths were then calculated from the angle at which the strips were hung and the weight attached to the sealed strips.

The following data were obtained:

| | Scuff Resistance, mg./100 sq. in. Scuffed | Blocking Temp., °F. | Sealing Strength, Gms./In. Width | | |
|---|---|---|---|---|---|
| | | | (Air Cooled Samples) | | Water Cooled, Slow Pull |
| | | | Quick Pull | Slow Pull | |
| 132° F. EMP Paraffin | 58 | 105 | 17 | 15 | 42. |
| +2.5% Alathon "C"* | 38 | 125 | 10 | 21 | 260. |
| +2.5% Alcowax 7** | 35 | 115–120 | 31 | 122 | 270+. |
| +1.5% Alathon "C" and 1.0% Alcowax 7. | 32 | 125 | 30 | 120 | 255. |
| +1.0% Alathon "C" and 1.5% Alcowax 7. | 35 | 125 | 35 | 110 | 300+ paper tears. |

*12,000–13,000 mol. wt. polyethylene.
**2,000 mol. wt. polyethylene having a terminal hydroxyl group.

The above data show that polyethylene raises the blocking point from 105 to 125° F., while polyethylene having a terminal hydroxyl group raises it only to 115–120° F. On the other hand, the sealing strength of the paper coated with the wax containing the polyethylene having a terminal hydroxyl group was materially better than that of the paper coated with the wax containing polyethylene. Despite the improved sealing strength of the Alcowax blend, the Alathon "C" blend would be more attractive commercially due to its higher blocking temperature. However, when these two materials are both blended into the wax not only are both the blocking temperature and the sealing strength increased as expected, but the increase in each is far more than would be calculated. For example, it would be expected that the blend containing both Alathon "C" and Alcowax would block at 120° F. Instead it blocks at 125° F.—a most unexpected improvement. Likewise, the sealing strength of the mixed blend would be expected to be 17 and 55 gms./in. by the quick and slow cooled method respectively. Actually it is the same as that obtained by the Alcowax alone—namely, 120 gms./in. In addition to this, the scuff resistance is not affected adversely but actually improved slightly in some cases.

The nature of the present invention having been thus fully set forth and specific examples of the same given, what is claimed as new and useful and desired to be secured by Letters Patent is:

1. A wax composition comprising paraffin wax containing from 0.5 to 10% by weight of a mixture of polyethylene and 40 to 60% by weight based on total polymer of polyethylene having a terminal hydroxyl group, said hydroxylated polyethylene being produced by polymerizing ethylene under 425–475 atmospheres at temperatures between 140° and 200° C. in the presence of isopropanol and hydrogen peroxide.

2. Composition according to claim 1 in which the polyethylene has a molecular weight of 4,000–25,000 and the polyethylene having a terminal hydroxyl group has a molecular weight of about 500–10,000.

3. Composition according to claim 1 in which the polyethylene has a molecular weight of 12,000–13,000 and the polyethylene having a terminal hydroxyl group has a molecular weight of about 2,000.

4. A wax composition comprising paraffin wax containing 1.5 to 2.5% by weight of a mixture of polyethylene and 40 to 60% by weight based on total polymer of polyethylene having a terminal hydroxyl group, said hydroxylated polyethylene being produced by polymerizing ethylene under 425–475 atmospheres at temperatures between 140° and 200° C. in the presence of isopropanol and hydrogen peroxide.

5. Composition according to claim 4 in which the polyethylene has a molecular weight of 4,000–25,000 and the polyethylene having a terminal hydroxyl group has a molecular weight of about 500–10,000.

6. Composition according to claim 4 in which the polyethylene has a molecular weight of 12,000–13,000 and the polyethylene having a terminal hydroxyl group has a molecular weight of about 2,000.

7. Composition according to claim 6 in which the amount of the total polymers is about 2.5% by weight.

References Cited in the file of this patent

UNITED STATES PATENTS

| Number | Name | Date |
|---|---|---|
| 2,504,400 | Erchack, Jr. | Apr. 18, 1950 |
| 2,512,459 | Hamilton | June 20, 1950 |
| 2,551,087 | Barnhart et al. | May 1, 1951 |